United States Patent
Elgarat

(10) Patent No.: US 11,606,435 B1
(45) Date of Patent: Mar. 14, 2023

(54) SYSTEM, METHOD, AND COMPUTER PROGRAM FOR ESTABLISHING APPLICATION INTERFACES IN AN ECHO SYSTEM

(71) Applicant: Amdocs Development Limited, Limassol (CY)

(72) Inventor: Sharon Elgarat, Kibbutz Mefalsim (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 10 days.

(21) Appl. No.: 17/202,130

(22) Filed: Mar. 15, 2021

(51) Int. Cl.
   *H04L 67/125* (2022.01)
   *H04L 67/00* (2022.01)
   *H04L 67/59* (2022.01)

(52) U.S. Cl.
   CPC ........... *H04L 67/125* (2013.01); *H04L 67/34* (2013.01); *H04L 67/59* (2022.05)

(58) Field of Classification Search
   CPC ........ H04L 67/125; H04L 67/59; H04L 67/34
   USPC ......................................................... 709/224
   See application file for complete search history.

(56) References Cited

U.S. PATENT DOCUMENTS

| | | | | |
|---|---|---|---|---|
| 10,552,442 | B1* | 2/2020 | Lusk | H04L 63/0884 |
| 11,201,789 | B1* | 12/2021 | Keane | H04L 41/0803 |
| 2008/0068144 | A1* | 3/2008 | Sato | B60R 25/24 |
| | | | | 340/426.36 |
| 2008/0077693 | A1* | 3/2008 | Alkiswani | H04L 67/565 |
| | | | | 709/227 |
| 2011/0167141 | A1* | 7/2011 | Bush | H04L 12/2807 |
| | | | | 709/222 |
| 2017/0041388 | A1* | 2/2017 | Tal | G06Q 50/01 |
| 2021/0203565 | A1* | 7/2021 | Arora | H04L 67/12 |
| 2021/0218594 | A1* | 7/2021 | Sundararajan | H04L 41/0894 |
| 2022/0122191 | A1* | 4/2022 | Boksha | G06Q 50/01 |

* cited by examiner

*Primary Examiner* — Jeffrey R Swearingen
(74) *Attorney, Agent, or Firm* — Zilka-Kotab, P.C.

(57) ABSTRACT

As described herein, a system, method, and computer program are provided for establishing an application interface in an echo system. In use, a plurality of end points in a plurality of applications installed on an echo system are identified. Each end point of the plurality of end points is analyzed to generate a classification for the end point according to one or more parameters. An interface is created between a pair of end points of the plurality of end points, based on the classification generated for each end point in the pair of end points. The interface is established in the echo system for enabling communication between the pair of end points.

20 Claims, 5 Drawing Sheets

SYSTEM, METHOD, AND COMPUTER PROGRAM FOR ESTABLISHING APPLICATION INTERFACES IN AN ECHO SYSTEM

FIELD OF THE INVENTION

The present invention relates to application management in an echo system.

BACKGROUND

Information Technology (IT) Companies own complex echo systems which include architectures with multiple software products connected by a variety of interfaces. These interfaces pass information from the providing application to the receiving application.

The interfaces may be direct interfaces in which one product requests the information and the other product exposes a service to allow the product to request it. To create or maintain a direct interface the IT company must invest in a development project which will customize the code of at least one of the software products, so it will be able to communicate with the exact structure expected by the other product in the interface.

Other interfaces may be indirect via a bus application linking them. The bus allows passively for the software product which triggers an activity to register the activity it performed on the bus, then any software application listening to the bus can grab information from the published activity and perform the activity on their side. To create or maintain an indirect interface via a bus, the two products involved must be customized. The system triggering the activity must customize to publish to the bus application in the IT Company's echo system. Then the application listening must customize to read the information from the bus as published.

All software products which the IT company purchases contain end points which either expect an interface to expose information or expect an interface to request information. These end points are designed with the structure the software product expected would be needed, without knowing which other product the IT company will select to connected it to. The end points may be created with different standards and technologies.

The IT Company may choose to buy a new product and onboard that product to its echo system, create new interfaces between existing end points in the products it already has in its architecture or modify an existing interface due to business requests which impact the applications connecting and the communicated information they pass between them. All these types of projects require the IT Company to invest in development of custom code for the purpose of integrating specific interfaces within select software products, which is costly, time consuming, and prone to error.

There is thus a need for addressing these and/or other issues associated with the prior art.

SUMMARY

As described herein, a system, method, and computer program are provided for establishing an application interface in an echo system. In use, a plurality of end points in a plurality of applications installed on an echo system are identified. Each end point of the plurality of end points is analyzed to generate a classification for the end point according to one or more parameters. An interface is created between a pair of end points of the plurality of end points, based on the classification generated for each end point in the pair of end points. The interface is established in the echo system for enabling communication between the pair of end points.

DETAILED DESCRIPTION

Figure 1:
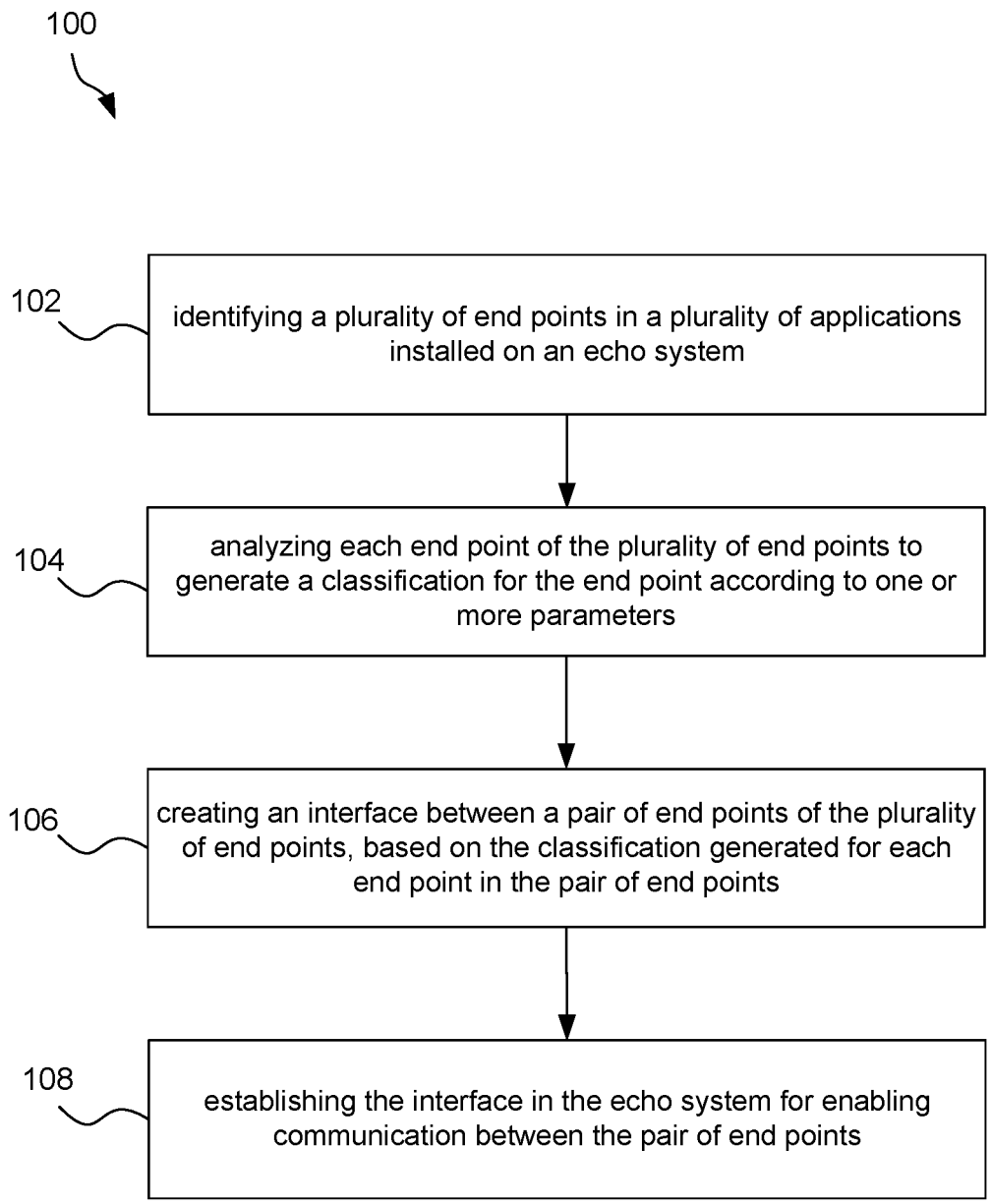
FIG. 1 illustrates a method for establishing an application interface in an echo system, in accordance with one embodiment.

FIG. 1 illustrates a method 100 for establishing an application interface in an echo system, in accordance with one embodiment. The method 100 may be performed any computer system described below with respect to FIGS. 4 and/or 5. For example, the method 100 may be performed by a computer system or combination of computer systems implemented as an echo system.

In operation 102, a plurality of end points in a plurality of applications installed on an echo system are identified. The echo system is a platform on which multiple applications are installed. The applications may be developed and provided by different entities, and thus may not be developed to interact with one another. However, as disclosed herein, the echo system includes capabilities to generate and establish interfaces between pairs of the applications that enable the applications to communicate with one another, and accordingly that enable integration of the applications.

The applications (e.g. software products) may be configured to independently provide various functionality. When the applications are integrated via the echo system, the output of one application can be provided as an input to another application. As a result, the functionality of the one application can operate on the data of the other application, for example.

Each of the end points may refer to a place in code of an application where data is expected to be received by an external system (e.g. application), or a place in the code in which the application exposes a service for external applications to access data. In one embodiment, the end points may be identified by receiving user input indicating the plurality of applications in the echo system, and analyzing code of the plurality of applications to identify the plurality of end points in the plurality of applications. The user input may indicate a location of each application in the echo system, such as a physical location on a server of the echo system in which the software is defined, or a virtual location providing access to the code of the application without access to a physical server of the echo system.

In operation 104, each end point of the plurality of end points is analyzed to generate a classification for the end point according to one or more parameters. The parameters may include a direction of the end point, a technology associated with the end point, a standard associated with the end point, a main purpose associated with the end point, a main business process associated with the end point, an entity impacted by the end point, and/or a main data element associated with the end point. To this end, the classification for each end point may include values for the one or more parameters.

In one embodiment, the classification may be generated for each end point by analyzing a name of the end point, a model associated with the end point, a signature associated with the end point, a technology associated with the end point, and/or a data sample associated with the end point. The classification may also be generated for each end point by analyzing application level attributes of the application the end point belongs to. These application level attributes may include a name of the application, a main purpose of the application, and/or a business process supported by the application.

In one embodiment, the analyzing may be performed using predefined rules to generate the classification. In another embodiment, the analyzing may be performed using Artificial Intelligence (AI) logic to generate the classification.

In operation 106, an interface is created between a pair of end points of the plurality of end points, based on the classification generated for each end point in the pair of end points. The pair of end points may be selected (e.g. matched, paired, etc.) from the plurality of end points in any desired manner, such as based on the classifications of the end points.

In one embodiment, a plurality of potential pairs of end points may be determined, based on the classification generated for each end point in the potential pair of end points. In this embodiment, each potential pair of end points may indicate two end points of the plurality of end points to potentially be configured to communicate with one another. As an option, the plurality of potential pairs of end points may be determined using AI logic (e.g. applied to the classifications). In an additional embodiment, the plurality of potential pairs of end points may be presented in a user interface, and a user selection of the pair of end points from the plurality of potential pairs of end points may be received (e.g. via the interface). In this embodiment, the interface may then be created between the pair of end points responsive to the user selection. In the case an AI logic is applied, the AI logic may include analysis of the structure of each end point and identification of the highest percentage of matching attributes within the structure. Once recommendations are provided based on the structure, the AI logic may refine its logic according to the final user selection, to assign weights to specific matching attributes within the structure, so in future recommendations, end points with matching attributes for the higher weighted attributes, will receive higher overall percentage matching and thus have a better chance to be recommended by the tool. The tool may also include learning of final selection by product, so if a future implementation of the tool requires matching of end points between two products which were previously investigated, the final selection of paired end points, made in the previous implementation, will receive a dramatically higher weighted grade, thus ensuring it will appear in the recommendation for the new implementation.

The interface may include configuration data that can be used by the echo system to enable the end points in the pair of end points to communicate with one another. In one embodiment, the interface may be created by generating a mapping between attributes of a first end point in the pair of end points and attributes of a second end point in the pair of end points. As an option, the mapping may be generated based on user input. In another embodiment, the interface may be created by generating a translation formula for the interface that converts information communicated between the end points in the pair of end points.

In operation 108, the interface is established in the echo system for enabling communication between the pair of end points. The interface may be established (e.g. deployed, etc.) by the echo system standing as gateway between the end points in the pair of end points. The echo system may configure itself as the receiving end point for the one of the end points (i.e. the data provider) and as the providing end point for the other one of the end points (i.e. the data receiver/consumer).

On an ongoing basis, while the applications are used, whenever the interface must be called, the echo system will pass the request and the response between the end points using the interface, and optionally translating the information so the providing end point could send the information it was designed originally to provide and the receiving end point could get the information in the original structure it was designed to receive. No customization is required once the interface is configured and established in the echo system.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
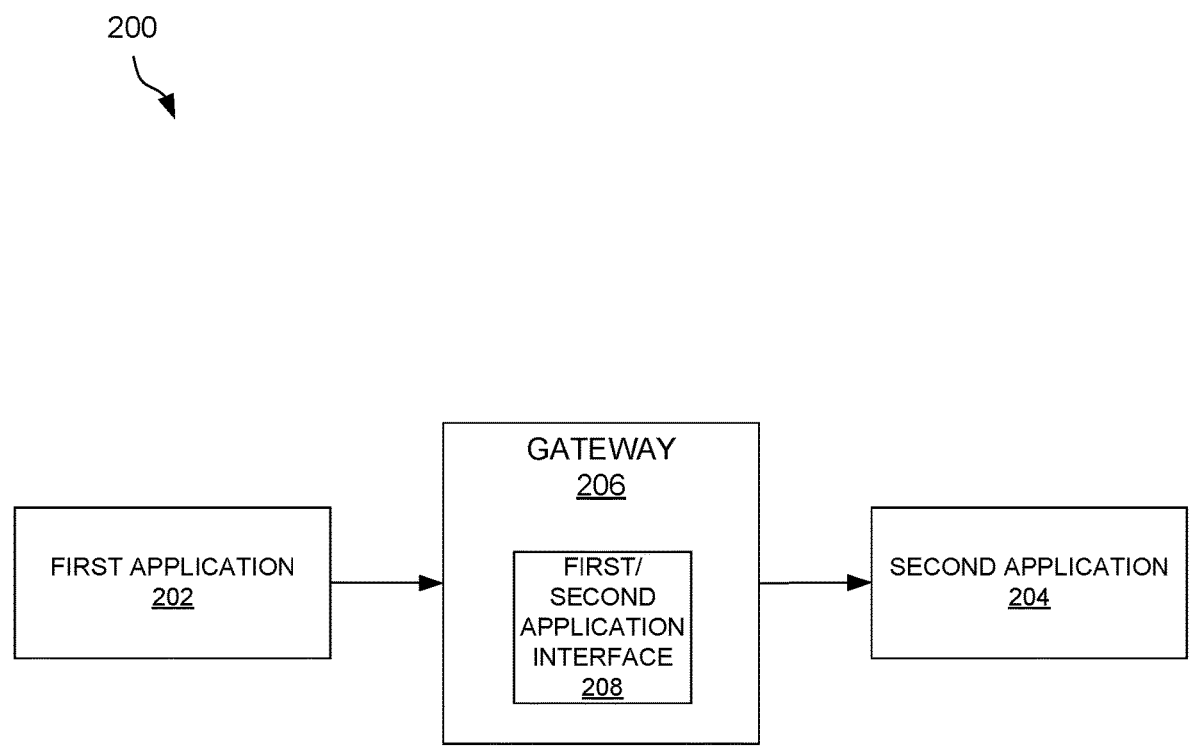
FIG. 2 illustrates an echo system flow diagram for interfacing applications, in accordance with one embodiment.

FIG. 2 illustrates an echo system 200 flow diagram for interfacing applications, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

As shown, the echo system 200 includes a plurality of applications 202, 204 installed thereon. The applications 202, 204 are independently developed (e.g. by a third party) without being configured to communication with one another. While two applications 202, 204 are shown in the present embodiment, it should be noted that this embodiment is set forth for exemplary purposes only and that the echo system 200 may include any number of different applications.

The echo system 200 also includes a gateway 206 which is a tool (e.g. application) of the echo system 200 that configures and establishes an interface 208 between the applications 202, 204. While the gateway 206 is described as both configuring and establishing the interface 208, it should be noted that other embodiments are contemplated in which the gateway 206 establishes the interface 208 while a separate component of the echo system 200 is used to configure the interface 208.

In order to configure the interface 208, the gateway 206 identifies a plurality of end points in the applications 202, 204, and analyzes each end point to generate a classification for the end point according to one or more parameters. The gateway 206 creates an interface 208 between a pair of end points of applications 202, 204, based on the classification generated for each end point in the pair of end points.

The gateway 206 then establishes the interface 208 in the echo system 200 for enabling communication between the applications 202, 204 via the pair of end points. Whenever the interface 208 must be called, the echo system 200 will pass the request and the response between the end points using the interface 208. No customization is required once the interface 208 is configured and established in the echo system 200.

Figure 3:
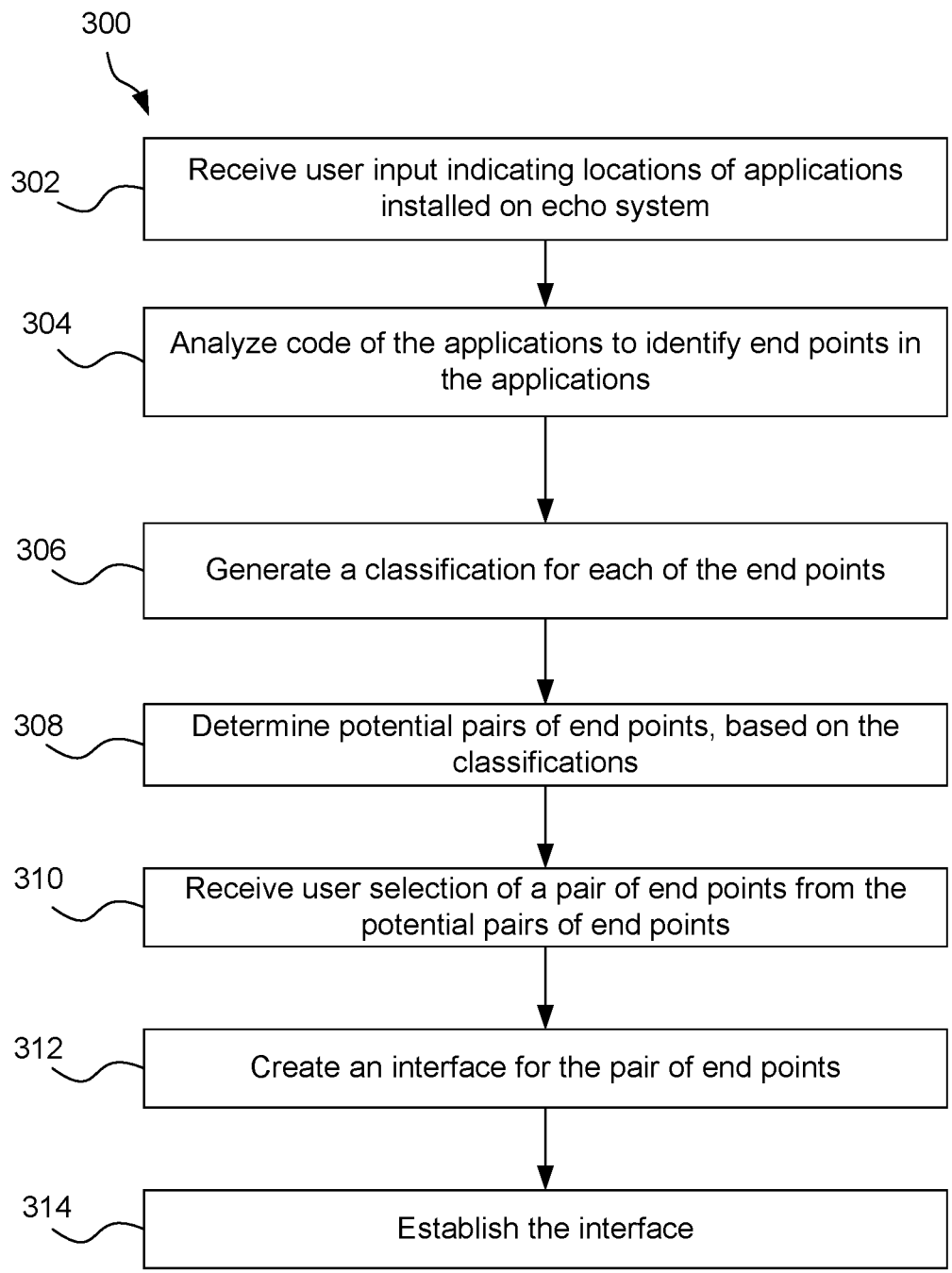
FIG. 3 illustrates a method for configuring and establishing an application interface in an echo system, in accordance with one embodiment.

FIG. 3 illustrates a method 300 for configuring and establishing an application interface in an echo system, in accordance with one embodiment. As an option, the method 300 may be carried out in the context of the details of the previous figure and/or any subsequent figure(s). For example, the method 300 may be carried out by the echo system 200 of FIG. 2, such as the gateway 206 of the echo system 200. Of course, however, the method 300 may be carried out in the context of any desired environment. Further, the aforementioned definitions may equally apply to the description below.

In operation 302, user input is received indicating locations of applications installed on an echo system. In one embodiment, a user interface may be presented which allows a user to provide the location of software products in the echo system. The user interface may include input elements that allow the user to identify the applications. In another embodiment, the user interface may be a configuration file in which the user can enter the information identifying the applications. The identification of the applications may be provided as the location on the echo system servers in which the applications are defined, or it may be identified as a virtual location providing access to the code of the applications without access to the physical servers of the echo system.

In operation 304, code of the applications is accessed and analyzed to identify end points in the applications. Code of the applications found in the specified locations may be sniffed, for example, to identify the end points. The end points will include all places in the code where an application expects data to be received by an external system (e.g. application) or places in the code in which the application exposes a service for an external system (e.g. application) to obtain, access, etc. data of the application. All end points may be registered and cataloged.

In operation 306, a classification is generated for each end point. In particular, the end points may be analyzed in order to classify them. The items analyzed to generate the classification may include the end point's name, model, signature, technology, data sample, etc. The analyzed items may also include application level attributes of the application the end point belongs to such as application name, main purpose, and/or supported business process. The classifications may be defined according to parameters such as the end point direction, technology, standard, main purpose, main business process, impacted entity, main data element, etc. The analysis may be done by a basic breakdown of known elements in application code to be analyzed.

In operation 308, potential pairs of end points are determined, based on the classifications. In one embodiment, AI logic may be used for the analysis of possible matching end points. For example, the AI logic may be used to search for commonalities in end points to identify patterns and analyze the strength of possible relations between end points. The AI logic may provide the top (e.g. 10) most likely matches for integration.

In particular, the AI logic may study the classifications (e.g. signatures) of the end points and may look for any combination of patterns including but not limited to the following patterns:

(1) Providing end point with receiving end point.
(2) Matching or partially matching attribute names within the primary key or mandatory attributes in the classifications on both sides.
(3) Matching or partially matching data types and valid values within the primary key or mandatory attributes in the classifications on both sides.
(4) Matching entity addressed by the end points based on values used in virtualized standalone tests.
(5) Historical usage from previous implementation of the two applications as part of an architecture.

The AI may then provide a weighted grade to each pattern met for every pair of end points thus grading all end points for compatibility to be placed in an interface. Once the user selects one of the end points and looks for the correct end point to connect it to, the weighted grade of the AI may be provided as a criteria to assist in selecting the highest compatibility end point to connect the interface to.

In operation 310, a user selection of a pair of end points from the potential pairs of end points is received. The user may be provided with the analysis information to allow him to determine which end points to configure as an interface in the echo system. The user may make the final decision as not all matching end points require connection. The interfaces may be established only based on the business target as understood by the user.

To provide the analysis (e.g. potential pairs) of the end points to the user, a user interface may be provided which may show the user the possible matching end points based on the AI patterns identified. The user interface may expose the analysis as a search page allowing the user to search and select the providing and receiving end points. The search may include all classifications the system was able to identify to allow minimization of the presented list and speed up the interface creation. The analysis may also be provided as an extract so that the user will be able to define the interfaces by updating them on a configuration file, after scanning the extract and using the classifications as filters to find within the extract the matching end points.

In operation 312, an interface is created for the pair of end points. The end points identified as matching for an interface are both operating based on the original settings of their respective applications. This means that although they intend to serve one interface in the architecture, they were not specifically designed to communicate with one another. The data passed from one end point is not of the type expected at the other end.

The classification (e.g. signatures) of both end points may be presented side by side to allow the user to select, for the interface, which attributes in each classification pass data to which attributes in the other classification. This definition may map one attribute to one, or one attribute to many, or many attributes to one, or many attributes to many, based on the needs of each end point. In case the receiving end point requires an attribute, the providing end point does not have data for, the user may also configure the interface to pass fixed data. In case the providing end point includes an attribute the receiving end point doesn't need, the user will be able to configure the interface to ignore it.

Once the mapping is configured for the interface, translation may still be needed to make sure the information sent by the providing end pint is modified before it is received by the receiving end point, so the values received will be exactly as the receiving end point is expecting them. The user may be allowed to define translation formulas for the interface to convert the information provided by the providing end point to the correct valid values expected by the receiving end point.

In operation 314, the interface is established in the echo system. The interface defined for the pair of end points may be established via a gateway between the end points. The gateway may configure itself as the receiving end point for the providing end point in the pair of end points, and may configure itself as the providing end point for the receiving end point in the pair of end points. On an ongoing basis, while the applications are used, whenever the interface must be called, the request and the response may be passed through the gateway between the end points, translating the information so the providing end point could send the information it was designed originally to provide and the receiving end point could get the information in the original structure it was designed to receive. No customization is required once the configuration of the interface and gateway is done.

It should be noted that operations 310-314 may be repeated to configure and establish any number of additional interfaces for additional pairs of end points. To this end, the echo system may provide proactivity in configuring and establishing interfaces between application end points, as well as zero-development needed to establish a new interface. The proactivity is achieved by the ability to identify any new end point introduced to the echo system, analyze the end points and assist the user in setting up the interface by configuration. The zero-development is achieved by the mapping of attributes, translation of values and the ongoing role in which the gateway acts as mediator between the two end points of the interface.

Figure 4:
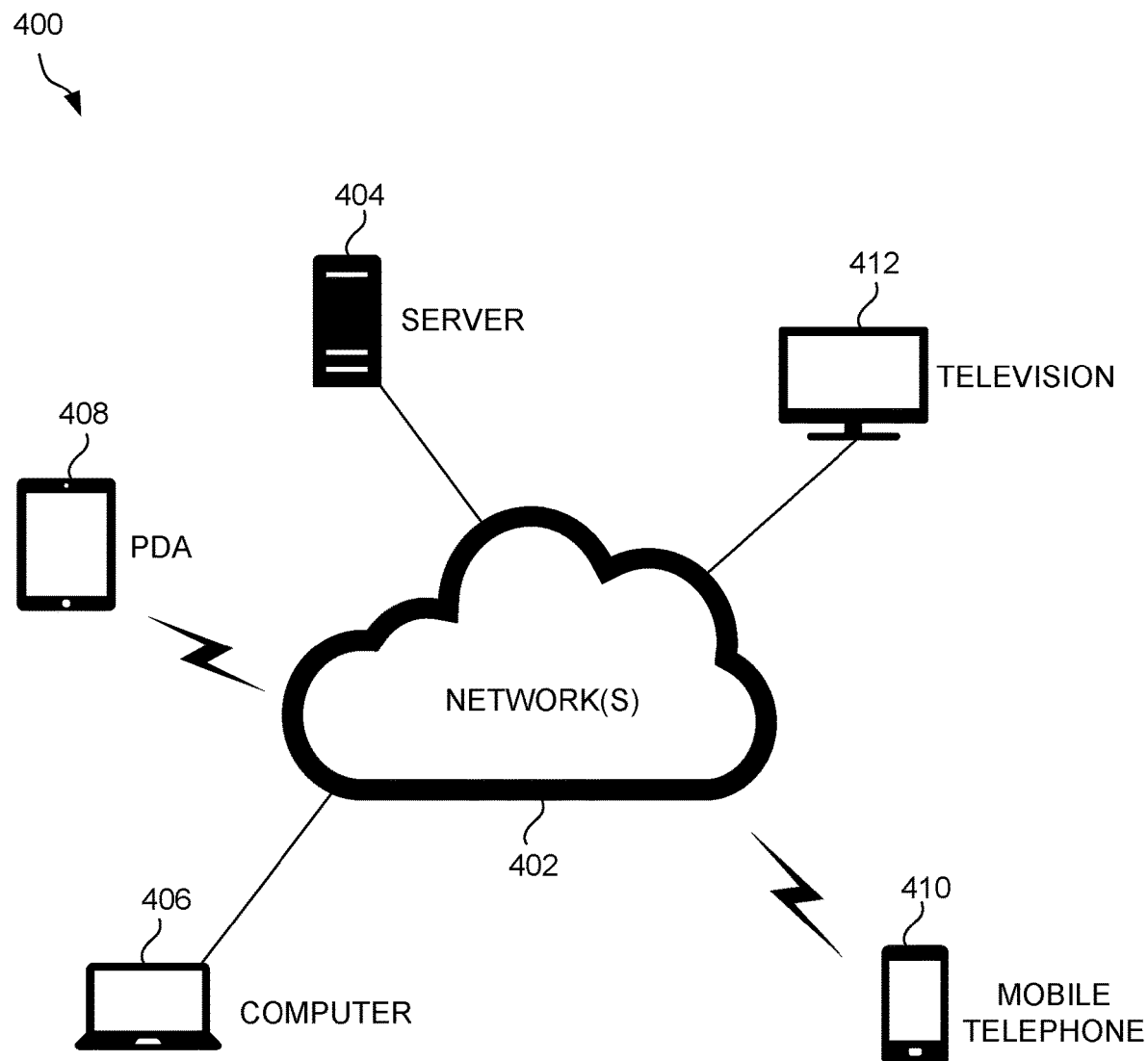
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
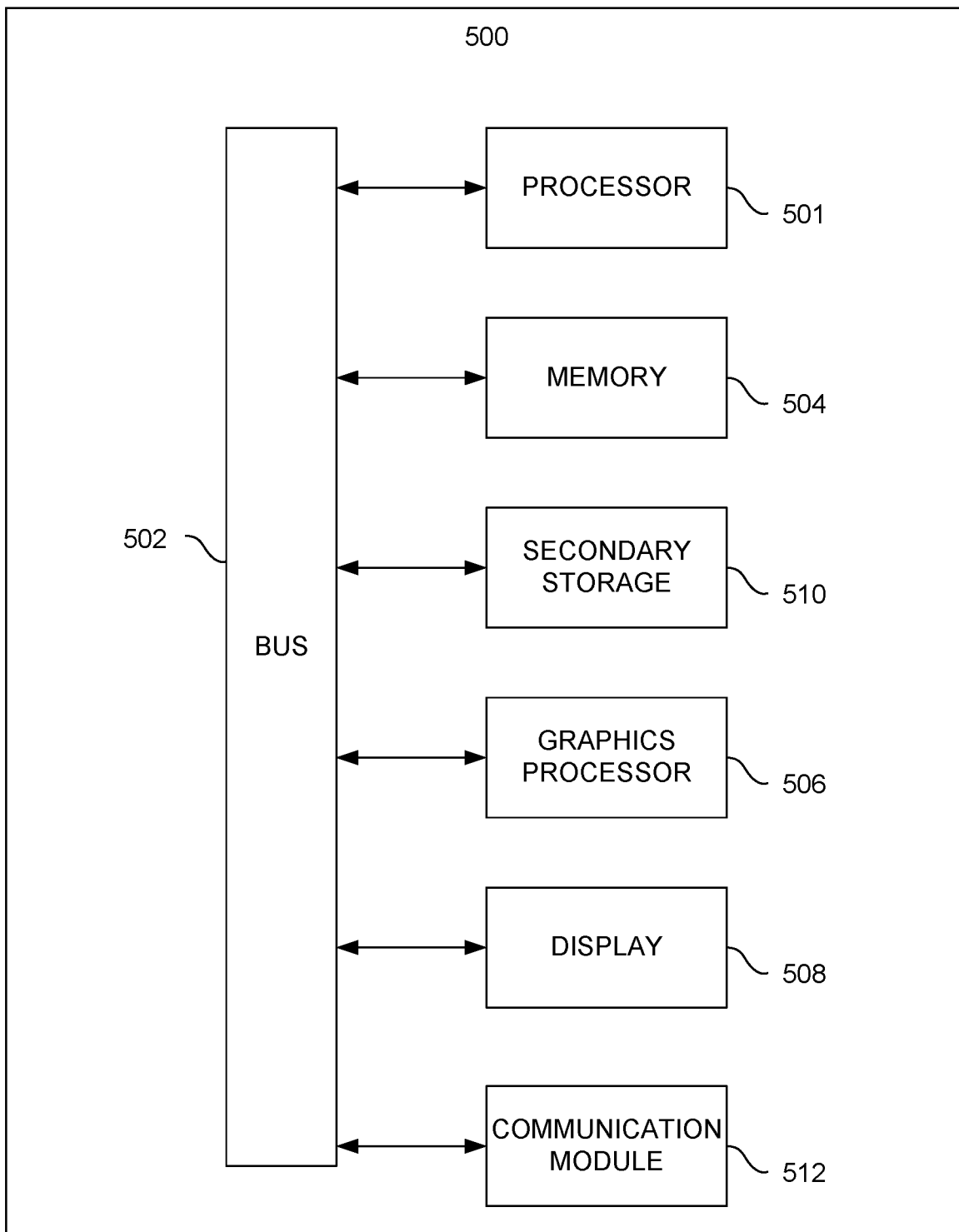
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   identifying a plurality of applications installed on an echo system;
   analyzing code of the plurality of applications to identify a plurality of end points in the plurality of applications, wherein the plurality of end points each include:
      a place in code of an application of the plurality of applications where data is expected to be received by an external system, or
      a place in the code in which the application exposes a service for external applications to access data;
   analyzing each end point of the plurality of end points to generate a classification for the end point according to one or more parameters;
   creating an interface between a pair of end points of the plurality of end points, based on the classification generated for each end point in the pair of end points; and
   establishing the interface in the echo system for enabling communication between the pair of end points.

2. The non-transitory computer readable medium of claim 1, wherein the plurality of applications are identified from user input.

3. The non-transitory computer readable medium of claim 2, wherein the user input indicates a location of each application of the plurality of applications in the echo system, and wherein the location is indicated as one of a physical location on a server of the echo system in which the software is defined or a virtual location providing access to the code of the application without access to a physical server of the echo system.

4. The non-transitory computer readable medium of claim 1, wherein the classification is generated for each end point by analyzing at least one of a name of the end point, a model associated with the end point, a signature associated with the end point, a technology associated with the end point, or a data sample associated with the end point.

5. The non-transitory computer readable medium of claim 4, wherein the classification is generated for each end point by further analyzing application level attributes of the application the end point belongs to.

6. The non-transitory computer readable medium of claim 5, wherein the application level attributes include at least one of a name of the application, main purpose of the application, or a business process supported by the application.

7. The non-transitory computer readable medium of claim 1, wherein the parameters according to which the classification is generated include a direction of the end point, a technology associated with the end point, a standard associated with the end point, a main purpose associated with the end point, a main business process associated with the end point, an entity impacted by the end point, and a main data element associated with the end point.

8. The non-transitory computer readable medium of claim 1, wherein the analyzing is performed using predefined rules to generate the classification.

9. The non-transitory computer readable medium of claim 1, wherein the analyzing is performed using Artificial Intelligence (AI) logic to generate the classification.

10. The non-transitory computer readable medium of claim 1, further comprising:
determining a plurality of potential pairs of end points, based on the classification generated for each end point in the potential pair of end points, wherein each potential pair of end points of the plurality of potential pairs of end points indicates two end points of the plurality of end points to potentially be configured to communicate with one another.

11. The non-transitory computer readable medium of claim 10, wherein the plurality of potential pairs of end points is determined using Artificial Intelligence (AI) logic which analyzes the classifications of the end points looks for at least one predefined pattern.

12. The non-transitory computer readable medium of claim 10, further comprising:
presenting the plurality of potential pairs of end points in a user interface;
receiving a user selection of the pair of end points from the plurality of potential pairs of end points;
wherein the interface between the pair of end points is created responsive to the user selection.

13. The non-transitory computer readable medium of claim 1, wherein creating the interface includes:
generating a mapping between attributes of a first end point in the pair of end points and attributes of a second end point in the pair of end points.

14. The non-transitory computer readable medium of claim 13, wherein the mapping is generated based on user input.

15. The non-transitory computer readable medium of claim 1, wherein creating the interface includes:
generating a translation formula for the interface that converts information communicated between the end points in the pair of end points.

16. The non-transitory computer readable medium of claim 1, wherein the plurality of applications are developed and provided by different entities, and wherein the plurality of applications are not developed to interact with one another, such that the pair of end points are enabled to communicate with one another, and accordingly a corresponding pair of applications of the plurality of applications are integrated, via the interface established in the echo system, and wherein the pair of applications are integrated such that output of one application in the pair can be provided as an input to another application in the pair.

17. The non-transitory computer readable medium of claim 1, further comprising:
selecting the pair of end points of the plurality of end points, based on the classification generated for each end point in the pair of end points.

18. The non-transitory computer readable medium of claim 1, wherein the interface is established by a gateway of the echo system existing between the end points in the pair of end points, such that the gateway configures itself as a receiving end point for one of the end points in the pair of endpoints and as a providing end point for the other one of the end points in the pair of endpoints.

19. A method, comprising:
identifying a plurality of applications installed on an echo system;
analyzing code of the plurality of applications to identify a plurality of end points in the plurality of applications, wherein the plurality of end points each include:
a place in code of an application of the plurality of applications where data is expected to be received by an external system, or
a place in the code in which the application exposes a service for external applications to access data;
creating an interface between a pair of end points of the plurality of end points, based on the classification generated for each end point in the pair of end points; and
establishing the interface in the echo system for enabling communication between the pair of end points.

20. A system, comprising:
a non-transitory memory storing instructions; and
one or more processors in communication with the non-transitory memory that execute the instructions to perform a method comprising:
identifying a plurality of applications installed on an echo system;
analyzing code of the plurality of applications to identify a plurality of end points in the plurality of applications, wherein the plurality of end points each include:
a place in code of an application of the plurality of applications where data is expected to be received by an external system, or
a place in the code in which the application exposes a service for external applications to access data;
creating an interface between a pair of end points of the plurality of end points, based on the classification generated for each end point in the pair of end points; and
establishing the interface in the echo system for enabling communication between the pair of end points.

* * * * *